United States Patent Office 2,698,273
Patented Dec. 28, 1954

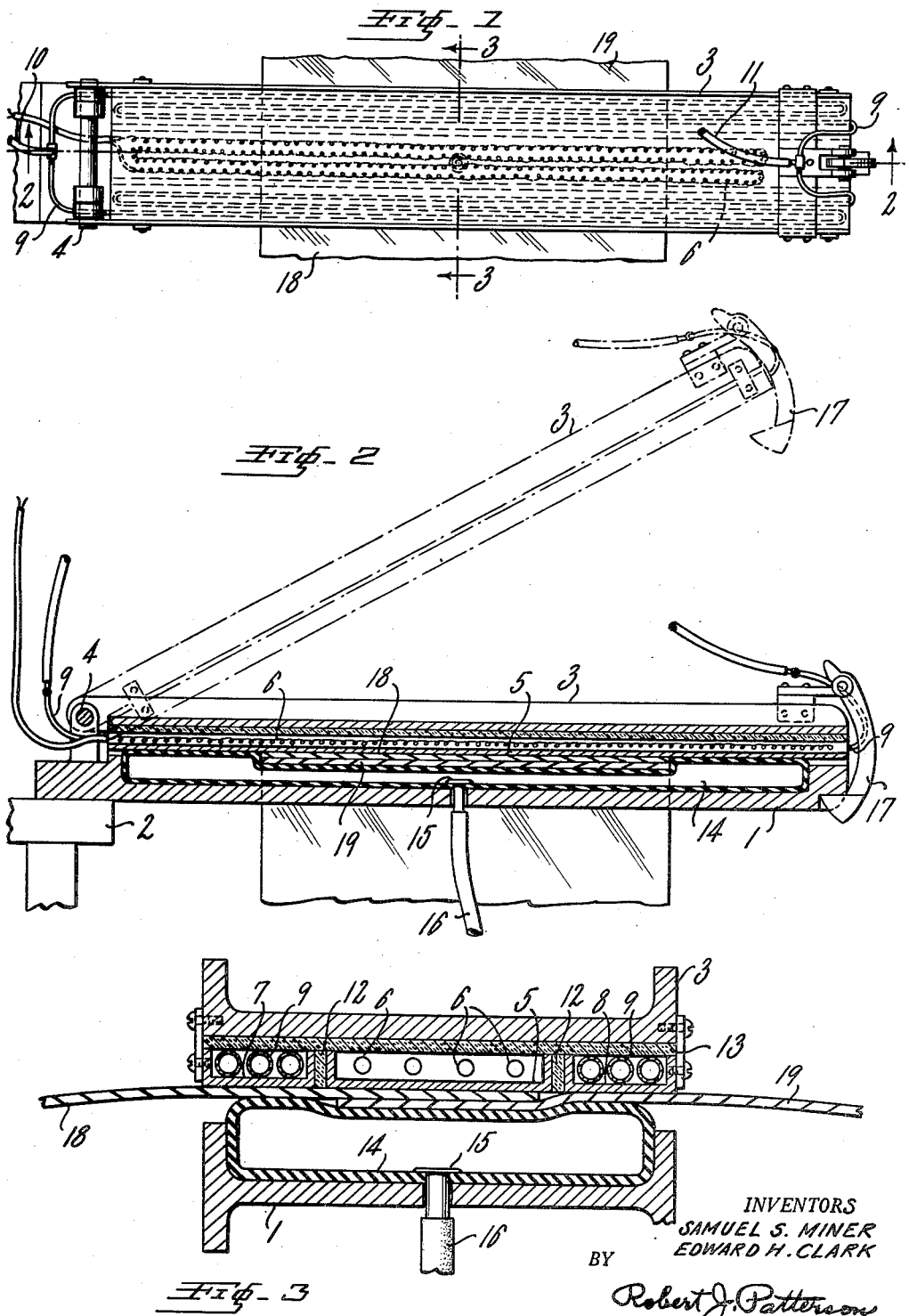

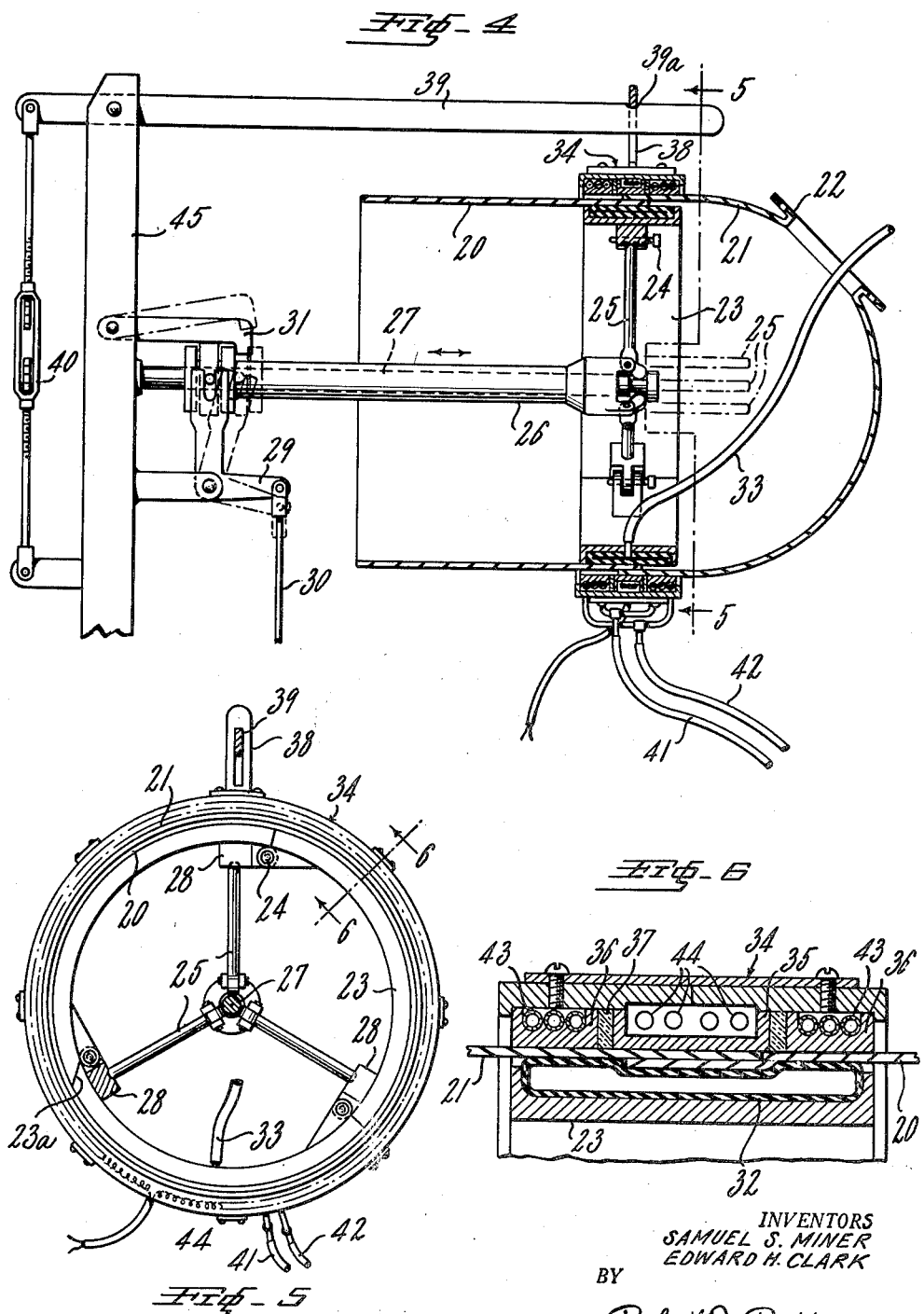

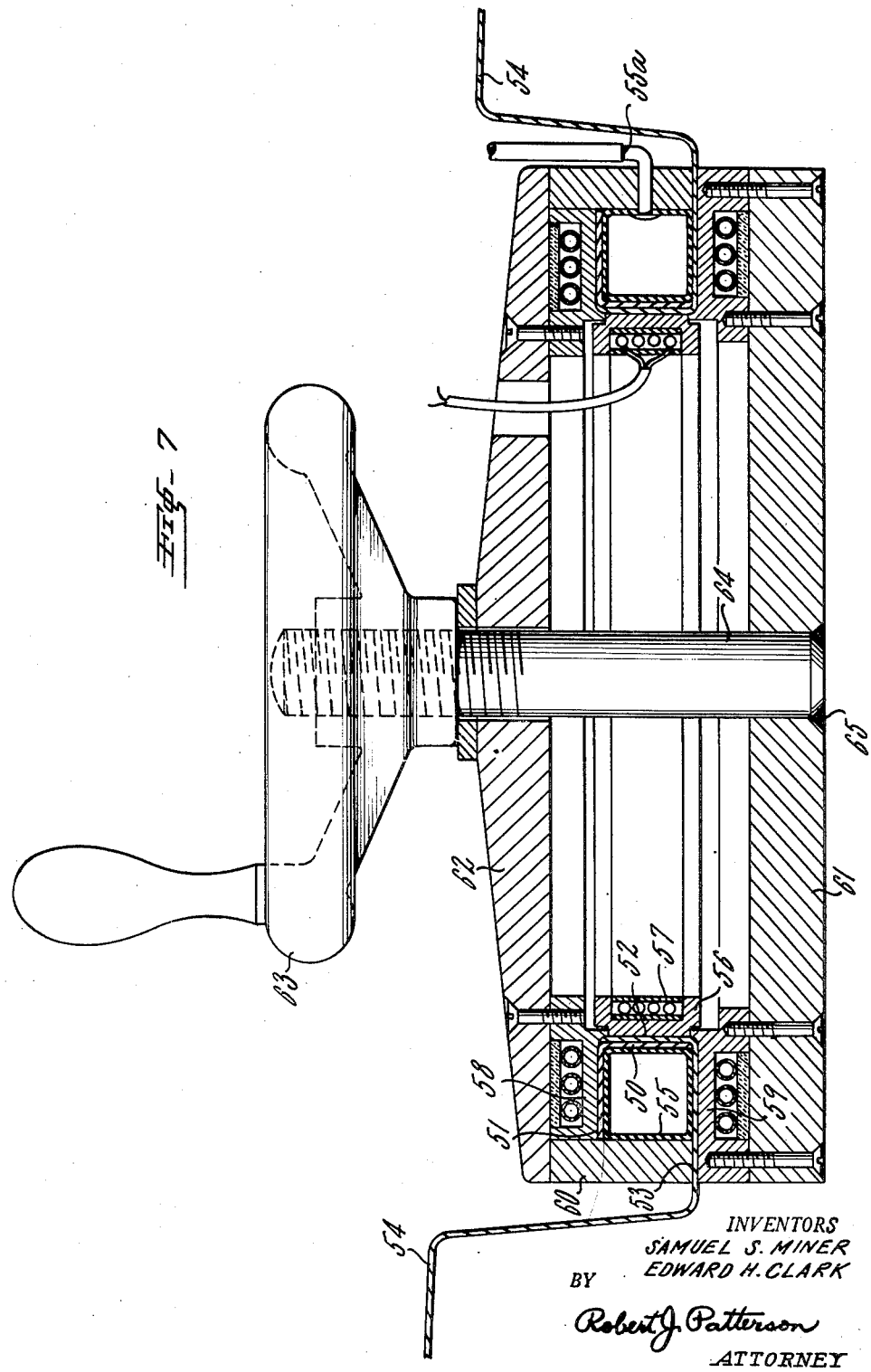

2,698,273

METHOD FOR JOINING THERMOPLASTIC SHEET MATERIAL

Samuel S. Miner and Edward H. Clark, Mishawaka, Ind., assignors to United States Rubber Company, New York, N. Y., a corporation of New Jersey Application October 19, 1949, Serial No. 122,212

8 Claims. (Cl. 154—116)

This invention relates to a method and apparatus for joining thermoplastic sheet material, particularly sheet polyethylene, especially of substantial thickness, i. e., of a thickness greater than that of foil, typically ranging from 0.01 inch upwardly to any desired thickness, say 0.5 inch.

The apparatus of this invention is described and claimed in copending divisional application Serial No. 426,617, filed April 22, 1954.

The problem of making satisfactory joints between sheets of polyethylene has existed for a considerable period of time. Polyethylene has a very sharp melting point. Just below the melting point it is a solid, while just above it, it is a free-flowing liquid. Therefore, the usual type of heat-sealing devices, which are satisfactory for joining such thermoplastic materials as polyvinyl chloride or copolymers of vinyl chloride and vinyl acetate, which only gradually become free-flowing liquids as the temperature is raised, will not work on polyethylene.

U. S. Patent 2,520,737 issued August 29, 1950 to Romeyn et al. and assigned to the assignee of the present invention, describes what is believed to be the first successful method of joining sheets of polyethylene of substantial thickness. In the method of that patent, the joining is effected by a very careful control of temperature and pressure, specifically by heating the material at the interface of the overlap to a temperature of not less than 5° C. below and not more than 15° C. above the melting point while applying pressure at the overlap, the heating and application of pressure being continued for a period of time substantially only that required to produce a satisfactory joint.

The present invention provides a method and apparatus for the joining of polyethylene sheets of substantial thickness without the precise control of temperature and pressure required by the above-mentioned patent.

While the invention is especially adapted to joining polyethylene sheets, the joining of which presents a particularly difficult problem, it may if desired be employed to effect homogeneous and integral joining of sheets of other thermoplastic materials which do not present the difficulties attendant upon the successful joining of polyethylene sheets. Examples of such other thermoplastic materials which may be joined by following the principles of the present invention are: polyvinyl chloride, copolymers of vinyl chloride and vinyl acetate, polyvinyl acetals, e. g., polyvinyl butyral, polyvinylidene chloride, polystyrene, acrylic resins such as polymeric methyl acrylate, polymeric methyl methacrylate and similar polymeric esters of acrylic acid and methacrylic acid, cellulose acetate, ethyl cellulose, etc.

In splicing sheets of thermoplastic material, the seam area where the sheets are lapped to form the joint is twice as thick as the single sheet of thermoplastic material, and, therefore, twice as much heat must be supplied as would be required to soften a single layer of the material. Consequently, the areas adjacent to the splice become very hot and soften much in advance of the lapped splice itself. For this reason splices in thermoplastics, especially those having a sharp melting point and low thermal conductivity like polyethylene, are very difficult to make. The present invention, however, overcomes this difficulty and makes it possible to effect such splices in a simple and commercially feasible manner.

The present invention is particularly advantageous because it enables the joining of polyethylene sheet materials so as to form an integral homogeneous one piece container of any desired size. Such containers are of extreme value for the storage and transportation of corrosive chemicals and for this reason the present invention is especially important since it provides a method of making such containers with ease and facility.

In the drawing:

Fig. 1 is a top plan view of a device, constructed in accordance with the invention, for making a lap joint between two flat sheets of thermoplastic material.

Fig. 2 is a longitudinal section on the line 2—2 of Fig. 1; the appearance of the platen-carrying portion of the device when open is portrayed in dotted lines.

Fig. 3 is a transverse section on the line 3—3 of Fig. 1.

Fig. 4 is a side view, with the joint-forming portion in longitudinal section, of a unit for making endless circular joints; this unit is especially adapted for joining the domed ends of a chemically resistant thermoplastic tank to a cylindrical body portion; it can also be used to join two cylindrical body portions to form a longer cylindrical body.

Fig. 5 is a front view of the joint-forming portion of the unit of Fig. 4, taken on the line 5—5 of Fig. 4.

Fig. 6 is a section on the line 6—6 of Fig. 5.

Fig. 7 is a vertical sectional view of a unit for joining a flanged collar to a flange projecting from the body of a cell.

The present invention is based upon the discovery that thermoplastic sheet materials, especially polyethylene in sheet form at least 0.01 inch thick, may be integrally and homogeneously joined to form a joint which is just as strong as the remainder of the assembly, by lapping two surfaces of the sheet material, heating the material in the area of the joint to a temperature substantially above its softening point and thereby causing it to fuse and flow together at the site of the joint, simultaneously maintaining the areas of the material immediately adjacent to and on each side of the area of the joint at a temperature substantially below the softening point by cooling, and confining the material at the joint under uniform pressure as it is being melted, while it is in molten condition, and thereafter during the subsequent cooling step until the material has cooled to a temperature substantially below its softening point. After the joint has been effected in this manner, heating is discontinued and the joint is cooled to a temperature substantially below its melting point in order to solidify the material forming the joint (which was melted and caused to flow together under the heat and pressure) and permit release of pressure and removal of the joint from the equipment.

In the preferred practice of the invention, uniform fluid pressure is applied to the material in the area of the joint and to the cooled adjacent areas by means of a flexible inflatable pressure-resisting bag which is inflated by a gas under pressure, usually air.

The invention is based upon the discovery that when the thermoplastic sheet material at the joint is heated up to above the softening point so that it becomes liquid, the normal tendency of the thermoplastic material to flow out under the pressure exerted at the joint may be prevented in a simple and economical way by cooling at each side of the joint so that the hot flowing thermoplastic material is cooled quickly, causing it to harden up at the edges of the joint. If these edges are not cooled in this way the molten material at the joint would flow out, under the pressure exerted, to such an extent that there would be practically no material left at the site of the joint. In the invention described in the patent of Romeyn et al., mentioned above, it was necessary to apply both heat and pressure judiciously. With the present invention the problem of holding the temperature and pressure within critical limits is eliminated, since in the present invention it does not matter how fluid the material in the area of the joint becomes or how much pressure is exerted upon this molten material because the provision of cooling on each side of the joint and the exertion of pressure across the lines between the joint and the cooled areas prevents the escape of the molten thermoplastic. The cooled material along the edges of the joint serves completely to confine the molten material between the boundaries of the heating platen, the pressure bag and the lateral cooled portions. Thus there are no mechanical confining means along the lateral edges of the joint, the material itself serving as the lateral barriers.

The drawings portray three different embodiments of apparatus for carrying out the present invention. These different embodiments are specially designed for effecting particular types of joints.

Referring now to the embodiment portrayed in Figs. 1 to 3 in the drawings, there is provided a lower stationary platen 1 fixedly supported in any suitable manner on support 2 and an upper platen member 3 which is pivoted at one end at 4 to one end of lower platen 1. Platen-carrying member 3 fixedly carries on its lower face a heating platen 5, heated by electrical resistance element 6, and two cooling platens 7 and 8 on each side of heating platen 5. Cooling platens 7 and 8 are cooled by the circulation of a coolant liquid through the pipes 9, the coolant entering and leaving via flexible tubes 10 and 11. The heating platen 5 and the cooling platens 7 and 8 are insulated from each other by insulation 12 and from the supporting member 3 by insulation 13.

The lower platen 1 is hollowed out to receive a rubber bag 14 equipped with valve 15 and supplied with inflating gas (almost invariably air) under pressure by flexible tube 16 for the purpose of applying pressure across the area of the joint and the adjacent cooled areas.

The upper platen member 3 is provided at its free end with a hook 17 which is adapted to lock the upper and lower members 3 and 1 together to resist the pressure exerted by the bag 14 while a joint is being formed.

In operation, two pieces of thermoplastic sheet material, 18 and 19 are laid across bag 14 while the press is open. The press is then closed, bag 14 is inflated, and platen 5 is heated to above the softening point of the thermoplastic material while platens 7 and 8 are cooled by the circulation of coolant through pipes 9 to hold the material at the sides of platen 5 at a temperature well below the softening point. After the seam has been made, the heating of platen 5 is discontinued until the joint has been cooled to a temperature well below the softening point after which the pressure is released and the press opened.

In the embodiment portrayed in Figs. 4 to 6 a circular seam is shown as being made between a cylindrical body portion 20 and a domed end cap 21 having a fitting opening 22, by a unit which utilizes the principles described above but which is especially adapted to the formation of circular joints. The unit comprises an annular ring or wheel 23 comprising three segments held together by pins 24. By removal of pins 24, the ring 23 can be collapsed inside the formed container, the three segments of ring 23 being removable through the relatively small fitting opening 22. An oblique break 23a is provided between two of the three segments of ring 23 in order to permit assembly and dis-assembly of the wheel 23.

Ring 23 is held in position by the three radial rods 25 which are pivoted at their inner ends to the enlarged end of a sleeve 26 so that rods 25 are moved from the radial position to the horizontal position when sleeve 26 is moved rightwardly of Fig. 4 along stationary shaft 27. The position of the rods 25 when they are thus unlocked from supporting engagement with wheel 23 is shown in dotted lines in Fig. 4. It will be understood that the outer ends of rods 25 are rounded slightly and engage slightly rounded depressions in lugs 28 which are integrally attached to the inside faces of the sections of the wheel 23. Thus the rods 25 can be moved into and out of supporting engagement with wheel 23 by the longitudinal movement of sleeve 26 which may be effected by a crank 29 actuated by a rod 30 which may be connected to a foot treadle (not shown). A safety latch 31 may be provided to prevent accidental movement of sleeve 26.

The ring 23 has on its outer face an annular channel in which is disposed the annular inflatable rubber pressure bag 32 supplied with air under pressure by tube 33 and the usual valve.

Surrounding ring 23 is an external ring member 34 disposed exteriorly of the portions 20 and 21 being joined. Ring 34 carries the heating platen 35 and the cooling platens 36 on each side thereof and separated therefrom by insulation 37.

Ring 34 is supported by an eye member 38 through which passes horizontal support 39. Support 39 can be adjusted by means of turnbuckle 40, so as to center ring 34 with respect to wheel 23. Notch 39a is formed in the upper face of support 39 to receive eye 38 and prevent undesired longitudinal movement of ring 34 out of alignment with wheel 23.

Platens 36 are cooled by coolant liquid supplied and withdrawn by flexible tubes 41 and 42, and circulated through annular cooling tubes 43 in platens 36. Platen 35 is heated by electrical resistance element 44.

Arm 39 and shaft 27 are supported by vertical support 45.

The operation of the unit of Figs. 4 to 6, when making a cylindrical thermoplastic vessel having domed ends, is as follows. The equipment and sections 20 and 21 are first arranged as shown in Fig. 4, the end cap 21 having opening 22 being applied before the other end cap (not shown but which has no opening), to permit assembly. Bag 32 is inflated and platens 35 and 36 are heated and cooled, respectively, to effect the joining. Application of heat to platen 35 is then discontinued and the joint is then cooled down to well below the softening point. Bag 32 is then deflated and spokes 25 are retracted to the dotted position of Fig. 4 by releasing latch 31 and pulling down on rod 30. Then the assembly comprising joined sections 20 and 21 and the wheel 23 is removed and reversed from the position shown in Fig. 4, the opening 22 now surrounding sleeve 26. Wheel 23 is now moved into longitudinal alignment with platen-carrying ring 34 and with the overlapping portions of section 20 and the other end section (not shown, but which is now in the position formerly occupied by section 21) which are to be joined. Spokes 25 are then moved into radial supporting engagement with wheel 23. The air bag 32 is then inflated to force the material at and adjacent the joint against the platens 35 and 36. The joint is next effected. After the joint has been made and cooled down to below the softening point, the spokes 25 are retracted again to the dotted-line position, bag 32 is deflated, and the assembly including the completed container with wheel 23 inside it is removed from the machine and taken to the bench where pins 24 are withdrawn and the three sections of the collapsible wheel 23 are removed through opening 22.

It is often preferred to lay a sheet of non-thermoplastic foil, preferably one of aluminum because of its excellent heat-transmitting characteristics, across the sectional platens of the units portrayed in Figs. 1 to 6, in order to prevent the insulation 12 and 37 between the sections from leaving an impression in the splice.

Referring now to the embodiment of Fig. 7, this is employed to weld flange 50 of an angular collar 51 to flange 52 projecting outwardly from a depressed portion 53 of a body 54. Flange 50 and flange 51 are overlapped and placed in the press as shown. The annular rubber inflation bag 55 is square in cross-section and when inflated applies pressure not only to the overlapped area but to the horizontal portions of the collar 51 and of the depressed portion 53 as well. Inflation air is supplied to bag 55 by tube 55a which enters through ring 60. The annular heating platen 56, heated by element 57, is adjacent to the overlap in vertical position and the two cooling platens 58 and 59 are positioned at right angles to platen 56 so as to cool any material which would tend to flow out from the splice area. Ring 60, surrounding bag 55 and upper cooling platen 58, restrains the bag and enables the bag when inflated to exert pressure on the joint and on the adjacent cooled areas. Ring 60 also functions as a spacer to limit the application of mechanical pressure to the press. Ring 60 is so arranged as to admit the material 53 between it and the cooling platen 59. Cooling platen 59 is fixedly carried on a bottom support 61 while cooling platen 58 is fixedly carried on an upper pressure-applying member 62. Pressure is applied to element 62 by hand wheel 63 which screw-threadedly engages central post 64 which is fixedly attached as by welding 65 to bottom member 61.

The operation of the embodiment of Fig. 7 will be obvious from the foregoing but may be briefly summarized as follows:

The member 61 is first positioned inside the body 54, which should be open at one end, with the portion 53 along cooling platen 59 as shown. Then ring 60, carrying bag 55, and ring-like heating platen 56 are placed into the position shown. Then the flanged collar 51 is inserted after which the pressure-applying element 62 is placed into position over post 64. Pressure is then applied by means of handwheel 63. Then bag 55 is inflated and the cooling platens 58 and 59 are cooled and heating platen 56 is heated to effect the joint. Thereafter operation is as before, element 61 being finally removed from within the body 54 through an open end thereof. It will be obvious that one or both of the cooling platens 58 and 59 may be disposed at an angle other than a right angle to the heating platen 56, when it is desired to form a shape other than that portrayed in Fig. 7.

It will also be obvious that if desired the cooling platens 7 and 8 (Figs. 1 to 3) and 58 and 59 (Fig. 7) may be grooved on the side next to the cooling tubes in a manner similar to that shown in Fig. 6 in order to assure intimate contact and good heat conductivity between the cooling tubes and the cooling platens.

Typical technique with polyethylene

In a typical example of making a splice from sheets of commercial polyethylene, 0.1 in. in thickness, pressure of about 5 lbs./sq. in. is first applied to the air bag. Then the heating element is turned on. The air pressure is then increased to about 10 lbs./sq. in. as the splice heats up. This serves to squeeze out trapped air. Cooling water is introduced into the side sections of the unit shortly after the center section has started to heat. About 5 minutes elapse from the time the heating element is turned on until the polyethylene at the splice is completely fused and flowed together. Then the power in the heating element is cut off and the rate at which water flows through the cooling elements is increased in order to cool down the entire splice as rapidly as possible. This requires about 6 minutes. The temperature of the splice during fusion is between 250° and 350° F. The area beneath the cooled sections of the platen is maintained at about 150° to 180° F. while the splice is being effected. After the splice has been completed it is cooled to below approximately 100° F. before it is removed.

General

The cycle given for commercial polyethylene in the preceding paragraph will vary where other thermoplastics are used. For instance, when sheets of a mixture of polyisobutylene (e. g., "Vistanex") and polyethylene are to be spliced, a higher temperature must be used since such a mixture softens at a higher temperature than polyethylene. The time and temperature will also vary with the type of splice. For instance, the circular splice takes a longer time than a straight line splice because there is more mass to heat up in the ring platen. Of course, all these variations can be made by the operator according to the particular needs. Those skilled in the art will be enabled to effect any desired splice by following the teachings of this specification.

In general, the heating platen is heated to a temperature substantially above the softening point, i. e., sufficiently thereabove to make the material completely molten so that it flows together to form a perfectly unbroken joint. It is preferred to heat the material at the joint to at least 10° F. above the softening or melting point, typically to from 10° to 110° F. thereabove.

In general, the cooling platens are cooled to such an extent as to maintain the material at the sides of the splice at a temperature substantially below the softening point, i. e., sufficiently therebelow that the material cannot flow under the pressure exerted by the bag. It is preferred to cool to such an extent as to keep the temperature of the material at the sides of the joint at least as low as 50° F. below the softening or melting point, commonly to from 50° to 100° F. below the melting point.

In general, the joint is finally cooled to at least 50° F. below the melting point and often to at least 130° F. therebelow before releasing the pressure.

As indicated above, in the case of commercial polyethylene, having a melting point of 115° C. (239° F.), it is often preferred to heat the joint to 250° to 350° F., to cool the adjacent areas to 150° to 180°, and to finally cool the joint to below 100° F. before removing it.

In general the pressure applied by the bag should be sufficient to cause the molten thermoplastic to flow together to give a unitary joint and to restrain and confine the molten material at the splice until it has solidified to such an extent as to be incapable of flowing under the pressure applied. Usually the pressure applied during splicing will be within the range of from 10 to 100 lbs./sq. in.

By the present invention heat, cooling and pressure are applied so as to cooperate in a new way to produce results never before achieved. The simultaneous melting at the joint, cooling of adjacent areas and application of uniform fluid pressure across the joint by means of the inflated rubber bag so cooperate that a perfectly homogeneous joint is produced in a simple and commercially feasible manner.

Having thus described our invention, what we claim and desire to protect by Letters Patent is:

1. A process of joining thermoplastic sheet material having a sharp melting point which comprises lapping two surfaces of said material, heating the material in the area of the joint to a temperature substantially above its softening point and thereby causing it to fuse and flow together to form an integral joint, simultaneously maintaining the material immediately adjacent to the area of the joint on both sides thereof at a temperature substantially below its softening point by cooling, applying substantially uniform fluid pressure to the material at the joint before it is molten, confining the material at the joint and along the cooled adjacent areas under uniform fluid pressure while the material at the joint is molten and thereafter until it has cooled to a temperature substantially below its softening point, and subsequently discontinuing said heating and cooling the resulting joint to a temperature substantially below its softening point.

2. A process of joining polyethylene sheet material which comprises lapping two surfaces of said material, heating the material in the area of the joint to a temperature substantially above its softening point and thereby causing it to fuse and flow together to form an integral joint, simultaneously maintaining the material immediately adjacent to the area of the joint on both sides thereof at a temperature substantially below its softening point by cooling, applying substantially uniform fluid pressure to the material at the joint before it is molten, confining the material at the joint and along the cooled adjacent areas under uniform fluid pressure while the material at the joint is molten and thereafter until it has cooled to a temperature substantially below its softening point, and subsequently discontinuing said heating and cooling the resulting joint to a temperature substantially below its softening point.

3. A process of joining material consisting of polyethylene in sheet form at least 0.01 inch thick which comprises lapping two surfaces of said polyethylene, heating the polyethylene in the area of the joint to a temperature substantially above its softening point and thereby causing it to fuse and flow together to form an integral joint, simultaneously maintaining the polyethylene immediately adjacent to the area of the joint on both sides thereof at a temperature substantially below its softening point by cooling, applying substantially uniform fluid pressure to the material at the joint before it is molten, confining the polyethylene at the joint and along the cooled adjacent areas under uniform fluid pressure while the polyethylene at the joints is molten and thereafter until it has cooled to a temperature substantially below its softening point, and subsequently discontinuing said heating and cooling the resulting joint to a temperature substantially below its softening point.

4. A process as set forth in claim 3 wherein the polyethylene at the joint is heated to a temperature of from 250° to 350° F. and the areas adjacent the joint are maintained at from 150° to 180° F. during fusion of the polyethylene at the joint, and wherein the joint is cooled to below 100° F. before the pressure is released.

5. A process of joining thermoplastic sheet material having a sharp melting point which comprises lapping two surfaces of said material, heating the material in the area of the joint to a temperature substantially above its softening point and thereby causing it to fuse and flow together to form an integral joint, simultaneously cooling the material in the areas immediately adjacent to the area of the joint on both sides thereof to maintain a temperature substantially below the softening point of said material, applying uniform fluid pressure to the material in both the heated and cooled areas during said heating and cooling steps and during the subsequent cooling step until the thermoplastic material at the joint has cooled to a temperature substantially below its softening point, after the material at the joint has flowed together to a homogeneous mass cooling the resulting joint to a temperature substantially below the softening point of said material, and thereafter releasing the pressure.

6. A process of joining polyethylene sheet material which comprises lapping two surfaces of the material to be joined, heating the material in the area of the joint to a temperature substantially above the softening point of the polyethylene material and thereby causing it to fuse and flow together to form an integral joint, simultaneously cooling the material in the areas immediately adjacent to the area of the joint on both sides thereof to maintain a temperature substantially below the softening point of said material, applying uniform fluid pressure to the material in both the heated and cooled areas during said heating and cooling and during the subsequent cooling step until said material at the joint has been cooled to a temperature substantially below its softening point, after the material at the joint has flowed together to a homogeneous mass cooling the resulting joint to a temperature substantially below the softening point of said material, and thereafter releasing the pressure.

7. A process of joining material consisting of polyethylene in sheet form at least 0.01 inch thick which comprises lapping two surfaces of the material to be joined, heating the material in the area of the joint to a temperature substantially above the softening point of the polyethylene and thereby causing it to fuse and flow together to form an integral joint, simultaneously cooling the polyethylene in the areas immediately adjacent to the area of the joint on both sides thereof to maintain a temperature substantially below the softening point of said polyethylene, applying uniform fluid pressure to the material in both the heated and cooled areas during said heating and cooling and during the subsequent cooling step until the polyethylene at the joint has cooled to a temperature substantially below its softening point, after the polyethylene at the joint has flowed together to a homogeneous mass cooling the resulting joint to a temperature substantially below the softening point of said polyethylene, and thereafter releasing the pressure.

8. A process as set forth in claim 7 wherein the polyethylene at the joint is heated to a temperature of from 250° to 350° F. and the areas adjacent the joint are maintained at from 150° to 180° F. during fusion of the polyethylene at the joint, and wherein the resulting joint is cooled to below 100° F. before releasing said pressure.

References Cited in the file of this patent

UNITED STATES PATENTS

| Number | Name | Date |
|---|---|---|
| 1,206,656 | Benedictus | Nov. 28, 1916 |
| 2,289,618 | Young | July 14, 1942 |
| 2,364,597 | Atwood | Dec. 12, 1944 |
| 2,405,675 | Southwick et al. | Aug. 13, 1946 |
| 2,433,176 | Van Epps et al. | Dec. 23, 1947 |
| 2,466,735 | Piazze | Apr. 12, 1949 |
| 2,469,972 | Lowry et al. | May 10, 1949 |
| 2,488,212 | Lloyd | Nov. 15, 1949 |